United States Patent [19]
Woog

[11] Patent Number: 5,173,247
[45] Date of Patent: Dec. 22, 1992

[54] SILVER RECOVERY DEVICE

[76] Inventor: Gunter Woog, 5435 Bauers Dr., West Bend, Wis. 53095

[21] Appl. No.: 418,495

[22] Filed: Oct. 10, 1989

[51] Int. Cl.5 .................... C22B 3/00; C22B 11/00
[52] U.S. Cl. ................................ 266/170; 75/733
[58] Field of Search ............ 75/109, 118, 713, 724, 75/733, 744; 266/170, 101

[56] References Cited

U.S. PATENT DOCUMENTS 3,857,703  12/1974  McGriffin .................... 75/724
4,331,472   5/1982  King, Jr. ...................... 75/109
4,331,473   5/1982  King, Jr. ...................... 75/713

Primary Examiner—Michael Lewis
Assistant Examiner—Steven Bos
Attorney, Agent, or Firm—Fuller, Ryan, Hohenfeldt & Kees

[57] ABSTRACT

Recovery apparatus to remove silver from solution including use of plastic chips such as are commonly used as packing materials to support scrap metal parts such as washer hole stampings in the flow path in a container between the inlet and outlet of the container.

5 Claims, 1 Drawing Sheet

SILVER RECOVERY DEVICE

BACKGROUND OF INVENTION

This invention relates to methods and apparatus for recovering spent metals or silver from solution, and particularly to use of ionic exchange chambers for recovering silver as the waste solution flows through a container.

U.S. Pat. Nos. 3,840,217, 3,692,291, 3,630,505 and 4,130,273 relate to apparatus for this type of recovery. These silver recovery units are structured to cause the silver bearing influent to contact an iron exchange metal so that an ionic exchange occurs between the metals with ferric ions replacing the silver ions in the solution and causing precipitation of metallic silver in the form of a sludge. The sludge is then recovered from the container.

Various devices are commercially available to accomplish these results. The various forms of replacement metal used commercially are a mesh screen material, spun steel wool, or iron filings glued to filter material. In the King, Jr., patent, U.S. Pat. No. 4,331,473, the metallic exchange medium comprises specially prepared buoyant elements composed of sponge iron glued or otherwise permanently adhered to expanded polystyrene beads. Although all of these forms of replacement metal are effective to accomplish the intended results, there is a need for lower cost devices in which the entire unit can be discarded after a reasonable period of use, and which does not involve an excessive amount of preparation prior to use.

This invention relates to improvements to the apparatus described above and to solutions to some of the problems raised thereby.

SUMMARY OF THE INVENTION

The invention provides a low cost metallic recovery device which uses scrap metal for the exchange medium and shipping or packing material as a filler to separate the scrap metal parts. Metal parts or scrap steel left from metal stamping operations such as the centers stamped out of washers in a stamping operation make an ideal metal exchange medium. The washer centers are separated in the flow path between the inlet and outlet of a plastic pail by polystyrene chips or disks commercially available as a filler for packaging purposes. The discrete metal exchange pieces can be randomly distributed through the filler or arranged in layers or bands separated by the chips. The chips also serve to diffuse the influent throughout the container to maximize the exposure of the metal parts to the influent.

Further objects, advantages and features of the invention will become apparent from the disclosure.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the appended claims.

Figure 1:
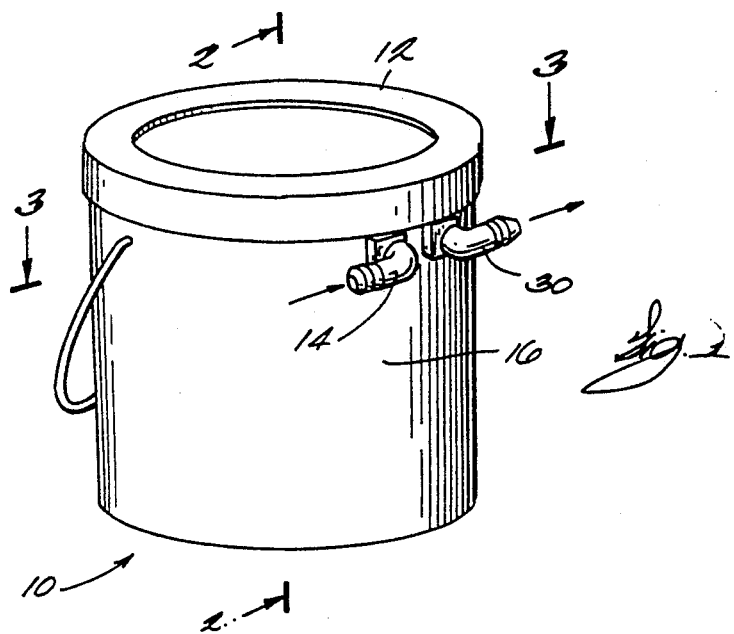
FIG. 1 is an isometric view of a container which contains the replacement media.

In the drawings, FIG. 1 shows an apparatus, constructed according to one embodiment of the invention, for recovering spent metals or silver from solution. The apparatus includes a conventional plastic pail or container 10 which comes in standard sizes with a snap-on lid or cover 12, a generally cylindrical side wall 16 and a generally flat bottom 17.

Figure 5:
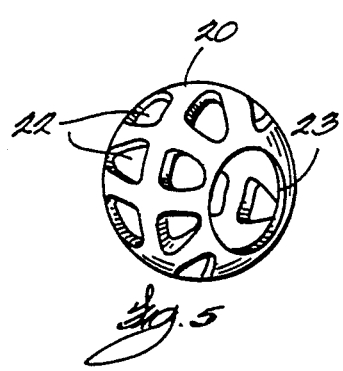
FIG. 5 is an isometric view of the inlet and outlet screen.
Figure 3:
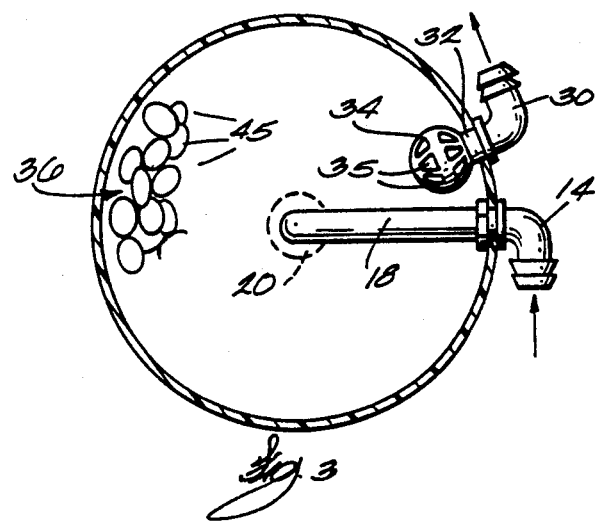
FIG. 3 is a top view along line 3—3 of FIG. 1.
Figure 2:
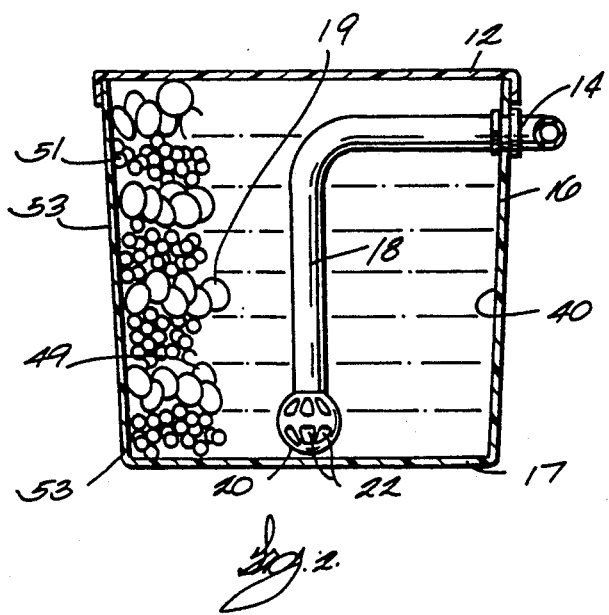
FIG. 2 is a sectional view along line 2—2 of FIG. 1.

Inlet means, for permitting the inflow of solution, are provided in the form of an elbow 14 which is connected through the side wall 16 to a tube 18, which tube is in fluid communication with a screen 20 inside the container 10. The screen 20 has a plurality of apertures 22 spaced about the periphery thereof. In one very low cost embodiment, a large aperture 23 (FIG. 5) is formed in a golf practice ball 20 of the type having a number of apertures 22, and the aperture 23 is positioned in registry with the open end of conduit 18 (FIG. 2). The ball 20 can be glued or otherwise affixed to the end of the tube 18 for this purpose.

Outlet means, for permitting the outflow of solution, are provided in the form of an elbow 30 which has an end 32 extending through the container side wall 16. A ball 34 (similar to ball 20) with a plurality of openings 35 is connected to the end 32 within the container 10.

Figure 4:
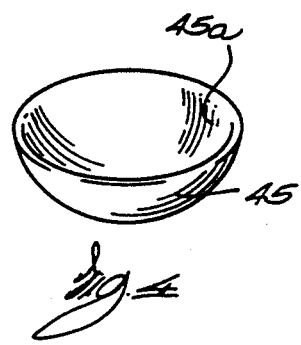
FIG. 4 is an enlarged isometric view of one of the particle means used according to the invention.

In accordance with the invention, inert particle means 36 are provided for separating a plurality of metal replacement pieces 51 in the interior 40 of the pail 10 in the flow path of solution between the inlet 20 and the outlet 34. In the disclosed construction the inert particle means 36 comprise a plurality of polystyrene chips 45 or disks of the type commonly used for packing or shipping material. Any inert particle means may be utilized, (for example gravel or small, one-half inch (½") diameter, pebbles), which provides good influent percolation and separation of metallic replacement pieces in layers. Most preferably the chips 45 have an open shape, such as a clam shell or cup shape, having a recess 45a (FIG. 4) of some type. The interstices 49 between chips 45 are sufficiently large to provide good percolation of the influent to the outlet 34 and also to diffuse and deflect the flow throughout the container 10. Layers of the metal pieces 51 are thus supported by the chips 45 throughout the container interior 40 and above the bottom 17.

The apertures 22 and 35 of balls 20 and 34 respectively are sized to prevent either the metal pieces 51, or the chips 45, acting as filter media, from entering and interrupting the flow through the inlet or outlet elbows 14 and 30. The balls 20 and 34 provide an inexpensive screen.

In the disclosed construction the metal replacement units or pieces 51 comprise washer center stampings, a by-product of washer manufacture, although any suitable metal or iron scrap particles having similar properties can be used. The metal pieces 51 and chips 45 can be stratified in layers 53 (FIG. 2) or be randomly distributed.

In use, a solution containing silver in ionic form is caused to flow through the inlet tube 18 and the ball 20 and percolate upwardly in flow paths through the interstices 49 in the aggregate of polystyrene chips 45 and metal pieces 51. The solution reacts with the exchange metal in the metal pieces 51 so that an ionic exchange occurs, with the ferric ions replacing the silver ions in solution. The silver then precipitates as a sludge which can be recovered. The entire container 10 can be discarded after use because of the minimal cost thereof.

In the most preferred embodiment, the metal pieces 51 are steel, rather than iron. Since steel includes a certain amount of carbon, this carbon will be released into the solution, causing the solution to darken visibly. Since the solution continuously but slowly flows from the inlet 20 to the outlet 34, and thereby exits the container 10, this carbon is removed from the container continually with the flow of the solution. Hence the darkening of the solution caused by the presence of the carbon is a visual indication of the fact that some iron is still available for exchange with the silver ions in the solution. When the carbon has been cleared out of the solution and the solution clears up, the clearing is an indication that no more iron is available for exchange with the silver ions, that is, that no more steel remains in the container 10, and the container may be discarded after recovery of the silver therefrom.

I claim:

1. Apparatus for recovering silver from a liquid solution, comprising:

wall means defining a metallic replacement chamber;

said chamber having means defining a fluid inlet and a fluid outlet to permit said solution to flow within said chamber from said inlet to said outlet in one or more flow paths;

a quantity of discrete metallic replacement pieces; and a quantity of support particles loosely mixed with the replacement pieces, for supporting the replacement pieces in spaced relationship with respect to each other and the chamber walls and in said flow paths between the inlet and outlet to afford free percolating movement of the influent to be treated through the chamber from the inlet to the outlet and into contact with the metallic replacement pieces and through interstices formed by and between the particles;

said support particles comprising polystyrene chips which are shell shaped with a recess open to the outside.

2. The apparatus of claim 1 wherein said outlet is provided with a spherical ball with spaced openings sized to prevent loss of aggregate material.

3. The apparatus of claim 1 wherein said metal replacement pieces comprise stamped washer centers.

4. The apparatus of claim 1 wherein the replacement pieces are sized smaller than said support particles, said particles being clam shell shaped, so that said replacement pieces are supported in said recesses of said support particles.

5. The apparatus of claim 1 wherein said metal replacement pieces are steel.

* * * * *